United States Patent [19]

Sugimori et al.

[11] 4,399,298
[45] Aug. 16, 1983

[54] CARBOXYLIC ACID ESTER DERIVATIVES OF 4-FLUOROPHENOL

[75] Inventors: Shigeru Sugimori; Yukio Honda; Tetsuhiko Kojima, all of Yokohamashi, Japan

[73] Assignee: Chisso Corporation, Osaka, Japan

[21] Appl. No.: 233,776

[22] Filed: Feb. 12, 1981

[30] Foreign Application Priority Data

Feb. 15, 1980 [JP] Japan .................................. 55-17247
Feb. 22, 1980 [JP] Japan .................................. 55-21298

[51] Int. Cl.³ ............................................ C07C 69/76
[52] U.S. Cl. .................................... 560/59; 560/66; 252/299.5; 252/299.68
[58] Field of Search ................. 560/59, 66; 252/299.5, 252/299.68

[56] References Cited

U.S. PATENT DOCUMENTS

| | | | |
|---|---|---|---|
| 3,953,491 | 4/1976 | Steinstrasser et al. | 560/66 |
| 3,979,321 | 9/1976 | Couttet et al. | 252/299.5 |
| 4,002,670 | 1/1977 | Steinstrasser | 560/66 |
| 4,018,507 | 4/1977 | Roghavan | 252/299.68 |
| 4,027,950 | 6/1977 | Moriyama et al. | 252/299.5 |
| 4,029,595 | 6/1977 | Ross et al. | 560/59 |
| 4,162,988 | 7/1979 | Maze et al. | 560/59 |
| 4,229,315 | 10/1980 | Krause et al. | 560/59 |
| 4,302,352 | 11/1981 | Eidenschenk et al. | 252/299.68 |

OTHER PUBLICATIONS

Titov, V., et al., Mol. Cryst. Liq. Cryst. 1978, vol. 47, pp. 1-5.
Gray, G. W., Mol. Cryst. Liq. 1976, vol. 37, pp. 157-188.

*Primary Examiner*—Paul J. Killos
*Attorney, Agent, or Firm*—Fred Philpitt

[57] ABSTRACT

Novel fluorine-containing organic compounds having a positive dielectric anisotropy, useful as component(s) of liquid crystal compositions, and liquid crystal compositions containing the same are provided. The compounds have the general formula

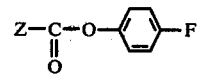

wherein Z is

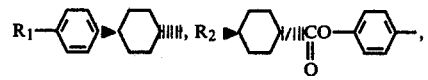

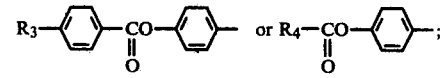

$R_1$ and $R_3$ both are 1-10 C alkyl or alkoxy; $R_2$ is H or 1-10 C alkyl; and $R_4$ is 1-10 C alkyl.

6 Claims, No Drawings

CARBOXYLIC ACID ESTER DERIVATIVES OF 4-FLUOROPHENOL

BACKGROUND OF THE INVENTION

1. Field of the Invention

This invention relates to novel fluorine-containing organic compounds having a positive dielectric anisotropy, useful as a component or components of liquid crystal compositions, and liquid crystal compositions containing the same.

2. Description of the Prior Art

Display elements to which liquid crystals are applied have come to be widely employed for clocks, electric calculators, etc. Such liquid crystal display elements are classified according to their liquid crystal display modes, into TN type (twisted nematic type), DS type (dynamic scatter type), guest-host type, DAP type, etc., and the liquid crystals employed according to the respective modes have varied characteristic properties; in any case, however, liquid crystals having a large absolute value of dielectric anisotropy have come to be required. Because, by employing liquid crystal compositions having a large absolute value of dielectric anisotropy, it is generally possible to reduce the drive voltage of display elements and it is also possible to improve the response characteristics thereof. However, if a liquid crystal which has a large absolute value of dielectric anisotropy, nevertheless enables display elements to be driven at a lower voltage is found, it is possible to further reduce the electric power of display elements consumed; hence such liquid crystals are more desirable.

The present inventors have searched widely for compounds having such characteristic properties, and as a result, have found that certain fluorine-containing compounds satisfy such requirements.

SUMMARY OF THE INVENTION

The present invention resides in ester derivatives of p-fluorophenol expressed by the general formula

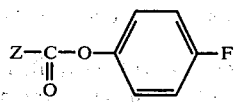

(I)

wherein Z represents a group selected from the group consisting of

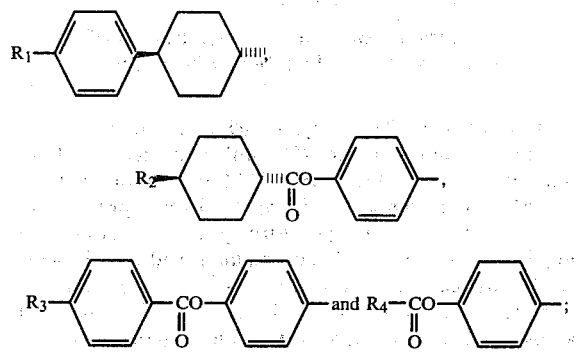

$R_1$ represents an alkyl group or an alkoxy group, each having 1 to 10 carbon atoms; $R_2$ represents H or an alkyl group having 1 to 10 carbon atoms; $R_3$ represents an alkyl group or an alkoxy group, each having 1 to 10 carbon atoms; and $R_4$ represents an alkyl group having 1 to 10 carbon atoms; and liquid crystal compositions containing at least one of the above ester derivatives.

DETAILED DESCRIPTION OF THE PREFERRED EMBODIMENTS

Some of the compounds of the formula (I) are of nematic liquid crystal, others thereof are of smectic liquid crystal, and further there are those which constitute no liquid crystal by themselves. In either case, however, liquid crystal compositions containing the compounds of the formula (I) have a lowered threshold voltage and also a lowered saturation voltage in spite of the fact that they have a small dielectric anisotropy; hence they make it possible to obtain liquid crystal display elements which have a lower drive voltage and hence a less electric power consumption. Liquid crystal compounds to be mixed with the compounds of the formula (I) may be adequately selected depending on the types, uses, etc. of the display apparatuses, and suitable particularly for preparing compositions having a higher N (nematic)-I (transparent) point. Further, those showing a smectic liquid crystal phase may also be used for phase transition type display elements, memory type display elements, etc. using a smectic liquid crystal phase. Further, the compounds of the formula (I) have stabilities to heat, light, humidity, electricity, etc. which are required for display elements, and also when they are mixed with other liquid crystals, they have a tendency that their viscosities are reduced.

Next, a method for preparing compounds expressed by the formula (II) shown below among the compounds (I) of the present invention will be illustrated. A trans-4-(4'-substituted phenyl)-cyclohexanecarboxylic acid is first prepared based on W. S. Johnson's method (J. Am. Chem. Soc., 68, 1648 (1946)), i.e. by reducing a 4'-substituted biphenyl-4-carboxylic acid with metallic sodium in isoamyl alcohol. The resulting material is then converted with thionyl chloride into a trans-4-(4'-substituted phenyl)-cyclohexanecarbonyl chloride, which is then reacted with 4-fluorophenol in pyridine to prepare a 4"-fluorophenyl ester of trans-4-(4'-substituted phenyl)-cyclohexanecarboxylic acid (II). The above process will be illustrated by the following chemical formulae:

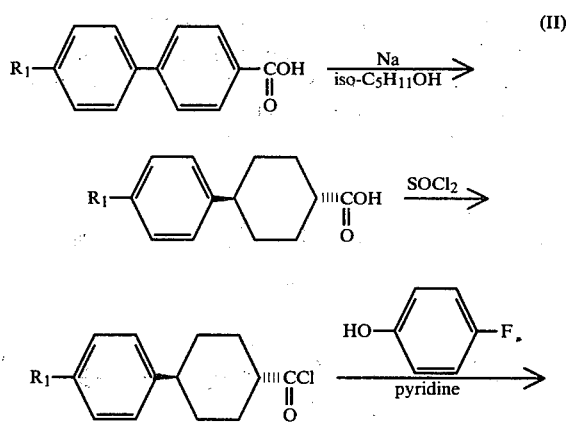

wherein $R_1$ in the above formulae has the same definition as above.

Next, 4″-fluorophenyl esters of 4-(trans-4′-substituted cyclohexylcarbonyloxy)-benzoic acid expressed by the formula (III) mentioned below, among the compounds (I) can be prepared by reacting a trans-4-substituted cyclohexanecarbonyl chloride with 4-hydroxybenzoic acid in the presence of pyridine, and then converting the resulting material with thionyl chloride into a 4-(trans-4′-substituted cyclohexylcarbonyloxy)-benzoic acid chloride, which is further reacted with 4-fluorophenol in the presence of pyridine. The above process will be illustrated by the following chemical formulae:

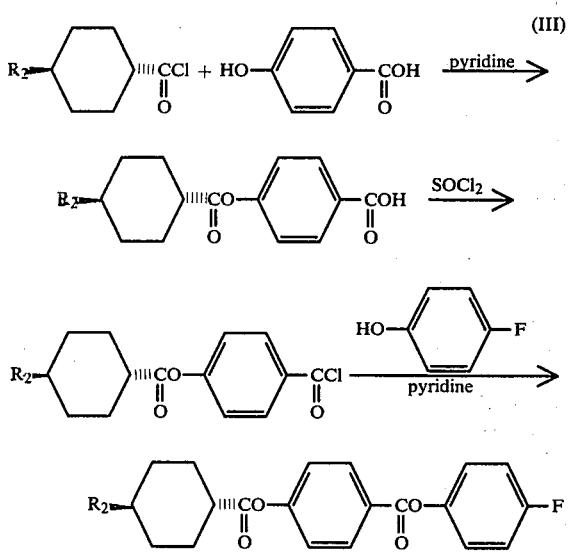

wherein $R_2$ in the above formulae has the same definition as above.

4″-Fluorophenyl esters of 4-(4′-substituted benzoyloxy)-benzoic acid expressed by the formula (IV) shown below, among the compounds (I) can be prepared by reacting a 4-substituted benzoic acid chloride with 4-hydroxybenozic acid in the presence of pyridine to obtain 4-(4′-substituted benzoyloxy)-benzoic acid, which is converted with thionyl chloride into its acid chloride, which, in turn, is reacted with 4-fluorophenol in the presence of pyridine. The process will be illustrated by the following chemical formulae:

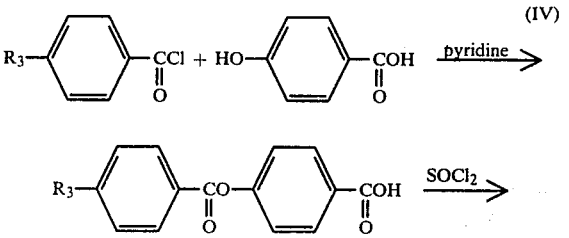

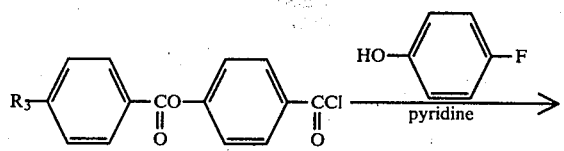

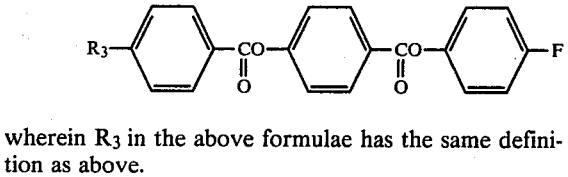

wherein $R_3$ in the above formulae has the same definition as above.

4′-Fluorophenyl esters of 4-acyloxybenzoic acid expressed by the formula (V) shown below, among the compounds (I) can be prepared by reacting a 4-acyloxybenzoic acid with thionyl chloride to obtain a 4-acyloxybenzoic acid chloride, which is then reacted with 4-fluorophenol in the presence of pyridine. The process will be illustrated by the following chemical formulae:

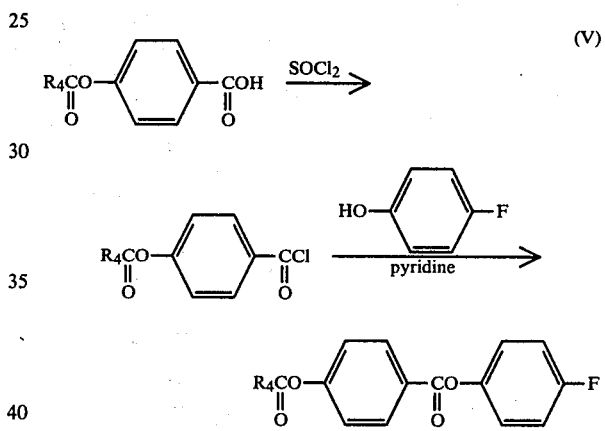

wherein $R_4$ in the above formulae has the same definition as above.

The present invention will be further described in more detail by way of Examples wherein the preparation examples of the compounds of the present invention expressed by the formula (I) and the use examples thereof are shown.

EXAMPLE 1

Preparation of 4″-fluorophenyl esters of trans-4-(4′-substituted phenyl)cyclohexanecarboxylic acid (II)

A 4′-substituted biphenyl-4-carboxylic acid (20 g) is added to isoamyl alcohol (500 ml) contained in a flask and they are heated up to 80° C. Metallic sodium (10 g) is added with vigorous stirring to form a precipitate, and the reaction temperature gradually rises and reaches about 130° C. When metallic sodium (30 g) is further added, the sodium comes not to react in a certain period of time. Since then, addition of isoamyl alcohol is continued in turn. In such a manner, 280 g of metallic sodium and 3,000 ml of isoamyl alcohol are used ultimately in total, and the reaction temperature rises up to about 160° to 170° C. When a completely uniform material has been obtained, the reaction temperature is lowered down to 120° C., and the flask is equipped with a dropping funnel and a solvent-distilling off means. When water is added little by little through the dropping funnel, a vigorous reaction occurs and isoamyl alcohol distills off. When almost all of isoamyl alcohol has distilled off, 1 l of water is added, followed by ice cooling and neutralization with dilute sulfuric acid. The resulting crystals are filtered off, sufficiently washed with water, recrystallized from acetic acid and further recrystallized from toluene to obtain a trans-4-(4'-substituted phenyl)-cyclohexanecarboxylic acid. This acid as an intermediate also has a liquid crystal property. The yields and the liquid crystal temperature ranges of the resulting products are shown in Table 1.

TABLE 1

| R | Yield (g) | Yield (%) | Phase transition point (°C.) | | | |
|---|---|---|---|---|---|---|
| | | | C-Sm point | Sm-N point | N-I point | Sm-I point |
| $C_2H_5$ | 6.8 | 35.0 | 185.0 | — | — | 202.4 |
| $C_5H_{11}$ | 10.5 | 51.5 | 176.0 | 204.8 | 206.0 | — |
| $C_7H_{15}$ | 9.5 | 46.5 | 182.0 | — | — | 204.2 |
| $C_5H_{11}O$ | 8.2 | 40.0 | 170.9 | — | — | 212.0 |
| $C_7H_{15}O$ | 6.8 | 34.0 | 176.5 | — | — | 216.4 |

To the trans-4-(4'-substituted phenyl)-cyclohexanecarboxylic acid (0.05 mol) is added thionyl chloride (50 ml), and the mixture is heated to 70° to 80° C. and placed under reflux. It becomes uniform in 2 to 3 hours, and excess thionyl chloride is distilled off under reduced pressured. The resulting residual oily substance is a trans-4-(4'-substituted phenyl)-cyclohexanecarbonyl chloride (acid chloride). This substance is added with vigorous stirring to a solution of 4-fluorophenol (5.5 g) (0.05 mol) dissolved in pyridine (30 ml). Further, toluene (100 ml) is added and the mixture is allowed to stand overnight and poured in water (100 ml), followed by separation of the resulting layers. The toluene layer is washed three times with 6 N HCl, once with water, three times with 2 N NaOH aqueous solution and with water till the layer becomes neutral, followed by distilling off toluene to precipitate crystals, which are recrystallized from ethanol to obtain an objective 4"-fluorophenyl ester of trans-4-(4'-substituted phenyl)-cyclohexanecarboxylic acid. The yields, physical properties (transition points) and values of elemental analysis of the resulting products are shown in Table 2.

TABLE 2

| R in formula (II) | Yield (g) | Yield (%) | Phase transition point (°C.) | | | Value of elemental analysis (%) | |
|---|---|---|---|---|---|---|---|
| | | | C-N point | N-I point | | Observed | Calculated |
| $C_2H_5$ | 5.9 | 36.0 | 88.3~89.0 | 112.5 | | | |
| $C_5H_{11}$ | 7.5 | 41.0 | 81.2~81.8 | 111.2 | C | 78.0 | 78.2 |
| | | | | | H | 8.0 | 7.9 |
| $C_7H_{15}$ | 10.8 | 55.0 | 59.2~59.8 | 99.5 | C | 79.1 | 78.9 |
| | | | | | H | 8.1 | 8.2 |
| $C_7H_{15}O$ | 9.1 | 45.0 | 78.6~79.4 | 130.7 | C | 75.8 | 75.9 |
| | | | | | H | 7.9 | 7.8 |

EXAMPLE 2

Preparation of 4"-fluorophenyl esters of 4-(trans-4'-substituted cyclohexylcarbonyloxy)-benzoic acid (III)

4-Hydroxybenzoic acid (10 g) (0.072 mol) is dissolved in pyridine (150 ml) and cooled with water. A trans-4-substituted cyclohexanecarbonyl chloride (0.07 mol) is added with vigorous stirring to the solution obtained above and reacted therewith. The resulting reaction liquid is allowed to stand overnight and then poured in water (500 ml) to form a precipitate, which is filtered off, washed with water, dried and recrystallized from acetic acid (100 ml) to obtain raw 4-(trans-4'-substituted cyclohexylcarbonyloxy)-benzoic acid (yield: 40 to 60%).

This substance (20 g) is reacted with thionyl chloride (50 ml) at 40° to 50° C. in a flask. When the reaction liquid has become uniform, it is allowed to stand for 2 hours, and excess thionyl chloride is then distilled off under reduced pressure, followed by distilling the resulting residual oily substance in vacuo to obtain a 4-(trans-4'-substituted cyclohexylcarbonyloxy)-benzoic acid chloride. The boiling points of the resulting products vary depending on the alkyl groups as substituents (corresponding to $R_2$ in the formula (III)) as seen in the following Table 3.

TABLE 3

| $R_2$ | Boiling point |
|---|---|
| H | 200~210° C./4 mmHg |
| $C_2H_5$ | 205~215° C./4 mmHg |
| $C_3H_7$ | 210~218° C./4 mmHg |
| $C_4H_9$ | 213~220° C./4 mmHg |
| $C_5H_{11}$ | 215~220° C./10 mmHg |
| $C_8H_{17}$ | 225~230° C./4 mmHg |

The thus obtained 4-(trans-4'-substituted cyclohexylcarbonyloxy)-benzoic acid chloride (0.01 mol) is added to a solution of 4-fluorophenol (1.1 g) dissolved in pyridine (20 ml) and reacted therewith. After completion of the reaction, toluene (50 ml) is added, and the mixture is allowed to stand overnight and then poured in water (100 ml). The resulting toluene layer is separated and washed three times with 6 N HCl, three times with 2 N NaOH and with water till the layer becomes completely neutral. Toluene is then distilled off from the layer under reduced pressure to leave crystals, which are recrystallized from ethanol and further recrystallized from n-heptane to obtain an objective 4"-fluorophenyl ester of 4-(trans-4'-substituted cyclohexylcarbonyloxy)-benzoic acid (compound of the formula (III)). The yields, physical properties and values of elemental analysis of the resulting products are shown in Table 4.

TABLE 4

| $R_2$ in formula (III) | Yield (g) | Yield (%) | Phase transition point (°C.) | | | Value of elemental analysis (%) | |
|---|---|---|---|---|---|---|---|
| | | | C-I point or C-N point | C-Sm point | N-I point or Sm-I point | Observed | Calculated |
| H | 1.8 | 52.6 | 105.4~107.1 | — | — | | |
| $C_2H_5$ | 2.0 | 54.1 | 91.3~92.2 | — | 167.0 | C 71.1 | 71.3 |
| | | | | | | H 6.9 | 6.3 |

TABLE 4-continued

| $R_2$ in formula (III) | Yield (g) | Yield (%) | Phase transition point (°C.) | | | Value of elemental analysis (%) | | |
|---|---|---|---|---|---|---|---|---|
| | | | C-I point or C-N point | C-Sm point | N-I point or Sm-I point | | Observed | Calculated |
| $C_3H_7$ | 2.0 | 52.1 | 84.1~87.5 | — | 185.9 | C | 72.3 | 71.9 |
| | | | | | | H | 6.7 | 6.6 |
| $C_4H_9$ | 2.1 | 52.8 | — | 80.5~82.7 | 117.4 | | | |
| $C_5H_{11}$ | 2.1 | 51.0 | — | 82.7~84.1 | 184.2 | | | |
| $C_8H_{17}$ | 2.3 | 50.7 | — | 74.2~76.2 | 164.2 | | | |

EXAMPLE 3

A 4-substituted benzoic acid chloride in place of the trans-4-substituted cyclohexanecarboxylic acid chloride in Example 2 is reacted with 4-hydroxybenzoic acid to obtain a 4-(4'-substituted benzoyloxy)-benzoic acid. When this acid (0.01 mol) thus obtained is reacted with thionyl chloride (20 ml) at 60° to 70° C., the reaction liquid becomes uniform in 2 hours. The liquid is allowed to stand further for one hour, followed by completely distilling off excess thionyl chloride under reduced pressure to obtain a 4-(4'-substituted benzoyloxy)-benzoic acid chloride, which is then added to a solution of 4-fluorophenol (1.1 g) dissolved in pyridine (20 ml) and reacted therewith, followed by allowing the reaction liquid to stand overnight, pouring it in water (200 ml), extracting the resulting material with toluene and washing the resulting toluene layer with 6 N HCl, next with 2 N NaOH solution and then with water till the layer becomes neutral. The resulting toluene layer is separated and toluene is distilled off under reduced pressure to leave crystals, which are twice recrystallized from ethanol to obtain an objective 4"-fluorophenyl ester of 4-(4'-substituted benzoyloxy)-benzoic acid. 4"-Fluorophenyl ester of 4-(4'-propylbenzoyloxy)-benzoic acid thus prepared is a compound of a smectic liquid crystal and has a C-Sm point of 112°~117° C. and a Sm-I point 197°~201° C. Further 4"-fluorophenyl ester of 4-(4'-heptylbenzoyloxy)-benzoic acid was also a compound of a smectic liquid crystal and had a C-Sm point of 92.5°~95.5° C. and a Sm-I point of 148.4° C.

EXAMPLE 4

4-Hexanoyloxybenzoic acid (14 g) and thionyl chloride (15 ml) are heated at 60° to 70° C. for 2.5 hours on a water bath, and when the mixture has become uniform, it is allowed to stand further for one hour, followed by distilling off excess thionyl chloride under reduced pressure and then distilling the resulting residual oily substance in vacuo to obtain 9 g of a fraction having a boiling point of 175°~178° C./5 mmHg, as 4-hexanoyloxybenzoic acid chloride, the total amount of which is added with vigorous stirring to a solution of 4-fluorophenol (4 g) dissolved in pyridine (15 ml), followed by allowing the mixture to stand overnight, pouring it in water (100 ml) and extracting the resulting precipitated crystals with toluene. The resulting toluene layer is washed with 6 N HCl, next with 2 N NaOH aqueous solution and then with water till it becomes neutral, followed by distilling off toluene under reduced pressure and then recrystallizing the residual crystals from ethanol to obtain 4'-fluorophenyl ester of 4-hexanoyloxybenzoic acid (7.6 g), which is a non-liquid crystal substance having a melting point of 54.6°~56.0° C.

EXAMPLE 5

(Use example 1)

A liquid crystal mixture A having a composition consisting of

| 4-pentyl-4'-cyanobiphenyl | 45%, |
|---|---|
| 4-heptyl-4'-cyanobiphenyl | 29%, |
| 4-octyloxy-4'-cyanobiphenyl | 15%, and |
| 4-pentyl-4'-cyanoterphenyl | 11% | has a N-I point of 63.3° C. and a dielectric anisotropy of +12.4. This liquid crystal mixture was sealed in a cell of 10 μm thick composed of two base plates equipped with transparent tin oxide electrodes each coated with silicon oxide and subjected to rubbing treatment, to prepare a liquid crystal cell, and its characteristic properties were measured at 25° C. to give a threshold voltage of 1.65 V and a saturation voltage of 2.31 V.

To this liquid crystal mixture A (80 parts by weight) was added 4"-fluorophenyl ester of trans-4-(4'-heptylphenyl)-cyclohexanecarboxylic acid (20 parts by weight) of the present invention to prepare a liquid crystal mixture, which had a N-I point of 64.5° C. and a dielectric anisotropy of +10.5. This mixture was sealed in the same cell as above, and its characteristic properties were measured under the same conditions as above to give a threshold voltage of 1.70 V and a saturation voltage of 2.40 V. The respective increases in these values were small in spite of the fact that the dielectric anisotropy lowered.

EXAMPLE 6

(Use example 2)

A mixture of the liquid crystal mixture A (80 parts by weight) in Use example 1 with 4'-fluorophenyl ester of 4-(trans-4'-ethylcyclohexylcarbonyloxy)-benzoic acid (20 parts by weight) of the present invention, had an increased N-I point of 75.7° C. and a lowered dielectric anisotropy of 11.9; nevertheless its threshold voltage and saturation voltage each measured under the same conditions lowered down to 1.60 V and 2.21 V, respectively.

EXAMPLE 7

(Use example 3)

A mixture of the liquid crystal mixture A (80 parts by weight) in Use example 1 with 4"-fluorophenyl ester of 4-(trans-4'-propylcyclohexylcarbonyloxy)-benzoic acid (20 parts by weight) of the present invention had an increased N-I point of 78.3° C. and a decreased dielectric anisotropy of +11.4; nevertheless its threshold voltage and saturation voltage each measured under the same conditions as above were 1.68 V and 2.39 V, respectively, i.e. each showed only a slight increase.

EXAMPLE 8

(Use example 4)

A mixture of the above liquid crystal mixture A (80 parts by weight) with 4″-fluorophenyl ester of 4-(trans-4′-butylcyclohexylcarbonyloxy)-benzoic acid (20 parts by weight) of the present invention had a N-I point of 69.0° C. and as considerably low a dielectric anisotropy as +10.3; nevertheless its threshold voltage and saturation voltage were 1.62 V and 2.31 V, respectively, i.e. almost unchanged from those of the mixture A.

What is claimed is:

1. Ester derivatives of p-fluorophenol expressed by the general formula

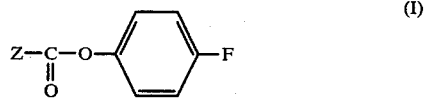
(I)

wherein Z represents a group selected from the group consisting of

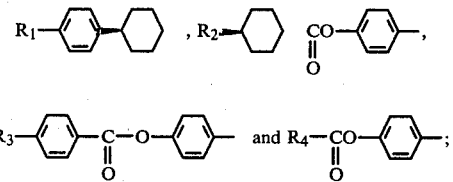

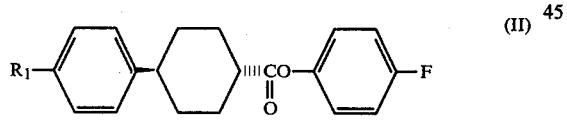

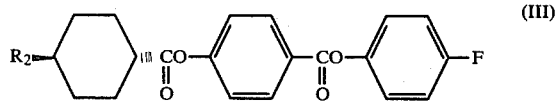

$R_1$ represents an alkyl group or an alkoxy group, each having 1 to 10 carbon atoms; $R_2$ represents H or an alkyl group having 1 to 10 carbon atoms; $R_3$ represents an alkyl group or an alkoxy group, each having 1 to 10 carbon atoms and $R_4$ represents an alkyl group having 1 to 10 carbon atoms.

2. Ester derivatives of 4-fluorophenol according to claim 1 wherein said derivatives are 4″-fluorophenyl esters of trans-4-(4′-substituted phenyl)-cyclohexanecarboxylic acids expressed by the general formula

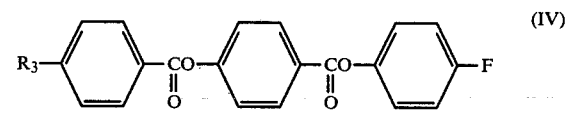
(II)

wherein $R_1$ represents an alkyl group or an alkoxy group, each having 1 to 10 carbon atoms.

3. Ester derivatives of 4-fluorophenol according to claim 1 wherein said derivatives are 4″-fluorophenyl esters of 4-(trans-4′-substituted cyclohexylcarbonyloxy)-benzoic acids expressed by the general formula

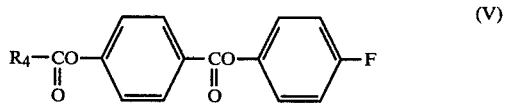
(III)

wherein $R_2$ represents H or an alkyl group having 1 to 10 carbon atoms.

4. Ester derivatives of 4-fluorophenol according to claim 1 wherein said derivatives are 4″-fluorophenyl esters of 4-(4′-substituted benzoyloxy)-benzoic acids expressed by the general formula

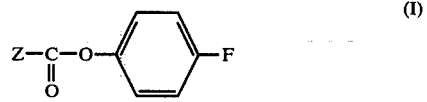
(IV)

wherein $R_3$ represents an alkyl group or an alkoxy group, each having 1 to 10 carbon atoms.

5. Ester derivatives of 4-fluorophenol according to claim 1 wherein said derivatives are 4′-fluorophenyl esters of 4-acryloxybenzoic acids expressed by the general formula

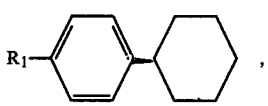
(V)

wherein $R_4$ represents an alkyl group having 1 to 10 carbon atoms.

6. Liquid crystal compositions comprising at least one of ester derivatives of p-fluorophenol expressed by the general formula

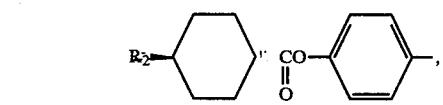
(I)

wherein Z represents a group selected from the group consisting of

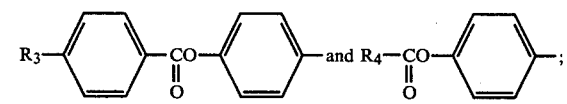

$R_1$ represents an alkyl group or an alkoxy group, each having 1 to 10 carbon atoms; $R_2$ represents H or an alkyl group having 1 to 10 carbon atoms; $R_3$ represents an alkyl group or an alkoxy group, each having 1 to 10 carbon atoms; and $R_4$ represents an alkyl group having 1 to 10 carbon atoms.

* * * * *